(Model.)

2 Sheets—Sheet 1.

J. E. SQUIRE.
CAR TRUCK.

No. 289,160.  Patented Nov. 27, 1883.

WITNESSES:

INVENTOR:
J. E. Squire
BY Munn & Co.
ATTORNEYS.

(Model.)

2 Sheets—Sheet 2.

J. E. SQUIRE.
CAR TRUCK.

No. 289,160.

Patented Nov. 27, 1883.

WITNESSES:

INVENTOR:

BY

ATTORNEYS.

UNITED STATES PATENT OFFICE.

JAMES E. SQUIRE, OF GLENCOE, ONTARIO, CANADA.

CAR-TRUCK.

SPECIFICATION forming part of Letters Patent No. 289,160, dated November 27, 1883.

Application filed April 26, 1883. (Model.)

*To all whom it may concern:*

Be it known that I, JAMES E. SQUIRE, of Glencoe, in the Province of Ontario, and Dominion of Canada, have invented a new and Improved Railway-Truck, of which the following is a full, clear, and exact description.

Reference is to be had to the accompanying drawings, forming part of this specification, in which similar letters of reference indicate corresponding parts in all the figures.

Figure 1:
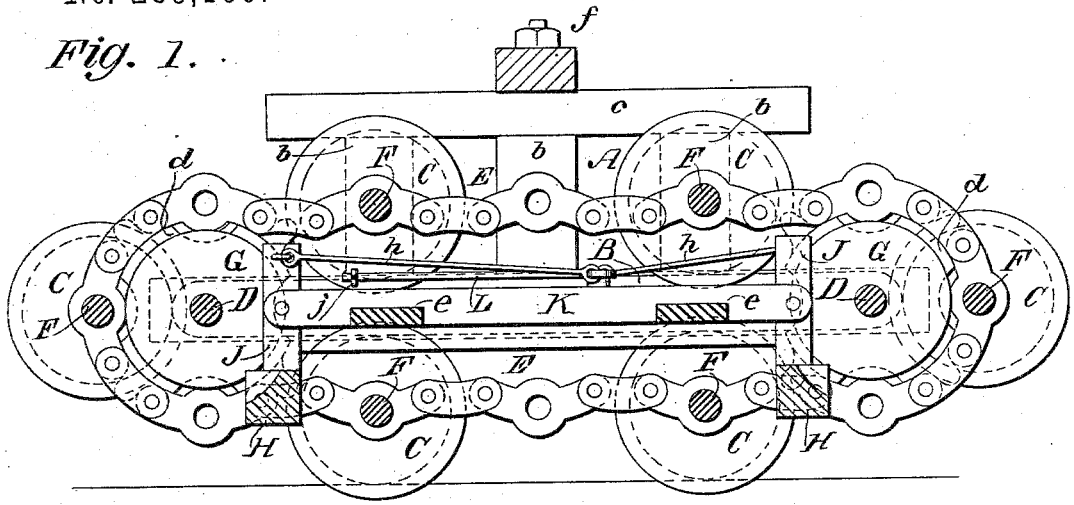
Figure 2:
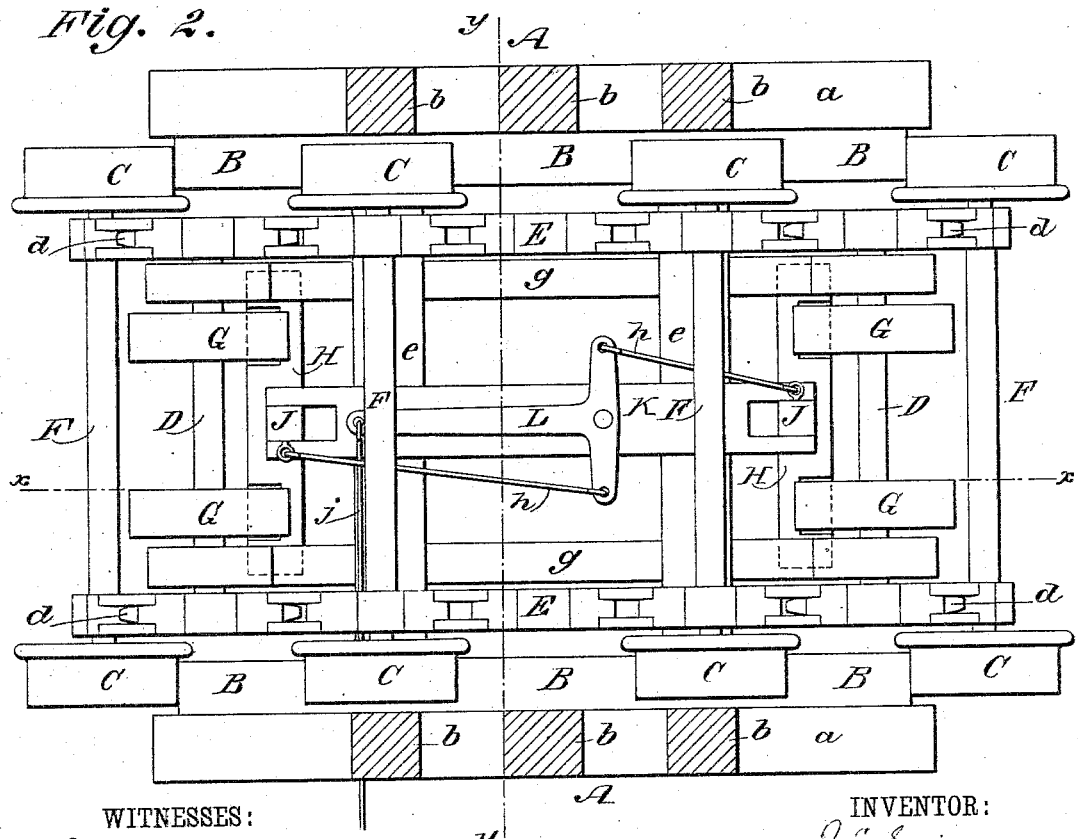
Figure 3:
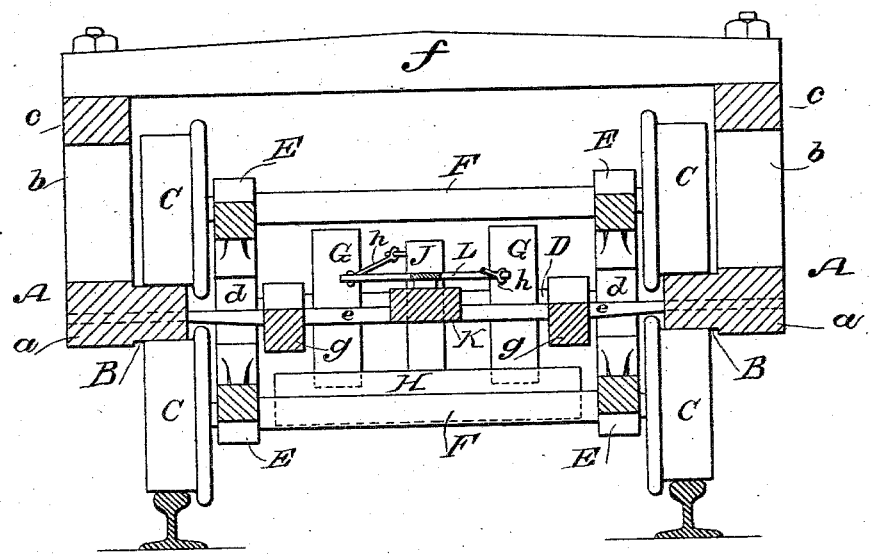

Figure 1 is a sectional elevation of my new and improved railway-truck, taken on the line $x$ $x$ of Fig. 2. Fig. 2 is a plan view of the same, the upper portion of the frame of the truck being removed; and Fig. 3 is a cross-sectional elevation taken on the line $y$ $y$ of Fig. 2.

The invention will first be described in connection with the drawings, and then pointed out in the claims.

Referring to the drawings, A A represent duplicate side pieces or frames of the frame of the truck, which are composed of the lower horizontal pieces, $a$ $a$, vertical studs $b$ $b$ $b$, upper horizontal pieces, $c$ $c$, and upper cross-piece, $f$, upon which latter the car-body (not shown) rests, and which also serves to tie the side frames, A A, together. The said frames A A are also tied together by the lower cross-plates, $e$ $e$. Upon the inner faces of the side frames, A A, (in this instance forming part of the lower horizontal pieces, $a$ $a$,) are formed the horizontal treads B B, which are rounded at their ends, and upon or around which the system of flanged wheels C C, which are all connected together by the endless chains E E and axles F F, run when the truck is in motion, and in the ends of the bars $g$ $g$, that are secured parallel with the frames A A, upon the cross-plates $e$ $e$, are journaled the shafts D D, on which are secured the sprocket-wheels $d$ $d$, over which the said endless chains E E pass, and by which the chains and wheels C C are kept in place. The wheels C C are made fast upon the axles F F, and these axles are journaled in corresponding links of the endless chains E E; but the wheels might be loose upon the axles and the axles made fast in the links of the chain, if desired.

G G represent brake-wheels which are made fast upon the shafts D D, and H H are the brake-bars, which are attached to the lower ends of the levers J J, which are pivoted to the ends of the central plate, K, secured upon the cross-plates $e$ $e$, which levers, together with the T-headed lever L, pivoted upon the plate K, connecting-rods $h$ $h$, and operating-rod $j$, serve to simultaneously apply the brake-bars H H to and let them off from the wheels G G when the said rod $j$ is drawn and released.

Constructed in this manner, it will be seen that the load (the car-body and its contents) rests upon the periphery of the wheels C C in succession as they come under the treads B B, and not upon the axles of the wheels, as heretofore, thus materially diminishing the friction of the truck; and it will also be seen that the truck is at the same time made very practical and strong, and that the wheels, when the truck is in motion have a progressive action both upon the track and the treads B, thus requiring the wheels to turn but one-half as often as in ordinary trucks with the same speed, so that less oil will be required to keep the truck in running condition, and there will be no danger of hot boxes, and the truck is thereby rendered much more durable than the ordinary form of truck.

Having thus described my invention, what I claim as new, and desire to secure by Letters Patent, is—

1. In a car-truck, the shafts D D, having sprocket-wheels $d$ and brake-wheels G G, substantially as and for the purposes set forth.

2. The combination, with the shafts D, having sprocket-wheels $d$ and brake-wheels G, of the brake-bars H and means for operating the same, substantially as and for the purposes set forth.

3. The combination, with the shafts D, having brake-wheels G, of the brake-bars H, levers J, T-lever L, and connections $h$ $h$ and $j$, substantially as and for the purposes set forth.

JAMES E. SQUIRE.

Witnesses:
HENRY H. SQUIRE,
GEORGE SOUSFIELD.